United States Patent [19]

Holubka

[11] Patent Number: 4,514,548

[45] Date of Patent: * Apr. 30, 1985

[54] CROSSLINKABLE COMPOSITION OF MATTER-I

[75] Inventor: Joseph W. Holubka, Livonia, Mich.

[73] Assignee: Ford Motor Company, Dearborn, Mich.

[ * ] Notice: The portion of the term of this patent subsequent to Apr. 30, 2002 has been disclaimed.

[21] Appl. No.: 455,678

[22] Filed: Jan. 5, 1983

[51] Int. Cl.$^3$ .................. C08F 283/00; C08L 63/00
[52] U.S. Cl. ........................... 525/528; 525/524; 525/526
[58] Field of Search ............ 525/524, 528, 526

[56] References Cited

U.S. PATENT DOCUMENTS

| | | | |
|---|---|---|---|
| 3,404,018 | 10/1966 | Hicks | 106/252 |
| 3,410,926 | 11/1966 | Hicks | 427/386 |
| 3,600,459 | 8/1971 | Vasta | 525/438 |
| 3,707,526 | 12/1972 | Gannon et al. | 528/115 |
| 3,749,758 | 7/1973 | Gannon | 528/110 |
| 3,804,786 | 4/1974 | Sekmakas | 523/415 |
| 3,922,253 | 11/1975 | Jerabek et al. | 528/45 |
| 3,947,338 | 3/1976 | Jerabek et al. | 204/181 |
| 3,969,300 | 7/1976 | Nagata et al. | 427/386 |
| 3,996,182 | 12/1976 | Hong et al. | 428/418 |
| 4,018,848 | 4/1977 | Khanna | 525/110 |
| 4,036,795 | 7/1977 | Tominaga | 204/181 |
| 4,036,800 | 7/1977 | Sekmakas et al. | 428/425 |
| 4,037,018 | 7/1977 | McGinniss | 428/418 |
| 4,101,486 | 7/1978 | Bosso et al. | 528/45 |
| 4,134,865 | 1/1979 | Tominaga | 528/45 |
| 4,134,866 | 1/1979 | Tominaga et al. | 528/45 |
| 4,134,932 | 1/1979 | Kempter et al. | 204/181 R |
| 4,145,323 | 3/1979 | Sekmakas et al. | 526/317 |
| 4,147,676 | 4/1979 | Pampouchidis | 528/44 |
| 4,176,099 | 11/1979 | Pampouchidis et al. | 528/49 |
| 4,207,222 | 6/1980 | Blum et al. | 428/512 |
| 4,238,594 | 12/1980 | Pampouchidis | 528/69 |
| 4,246,151 | 1/1981 | Dohy et al. | 204/181 |
| 4,247,659 | 1/1981 | Sekmakas et al. | 525/43 |
| 4,256,621 | 3/1981 | Shimokai et al. | 204/181 |
| 4,274,989 | 6/1981 | Tominaga et al. | 428/418 |
| 4,278,580 | 7/1981 | Schmolzer et al. | 525/507 |
| 4,289,811 | 9/1981 | Shelley, Jr. | 427/239 |
| 4,293,672 | 10/1981 | Jackson | 525/507 |
| 4,294,940 | 10/1981 | Hino et al. | 525/124 |
| 4,296,010 | 10/1981 | Tominaga | 525/424 |
| 4,356,276 | 10/1982 | Hönig et al. | 525/528 |

FOREIGN PATENT DOCUMENTS 2065126A 6/1981 United Kingdom ............... 525/528

Primary Examiner—John C. Bleutge
Assistant Examiner—A. L. Carrillo
Attorney, Agent, or Firm—Peter D. McDermott; Roger L. May

[57] ABSTRACT

A novel composition of matter is provided, which comprises certain polydiene-functionalized epoxy-amine adduct and certain polydieneophile-functionalized epoxy-amine adduct, which epoxy-amine adducts are co-reactive at elevated cure temperature. The polydiene-functionalized epoxy-amine adduct comprises the reaction product of certain polyhydroxy functional epoxy-amine reactant with diene-functional mono-isocyanate reactant. The polydieneophile-functionalized epoxy-amine adduct comprises the reaction product of certain polyhydroxy functional epoxy-amine reactant with dieneophile functional mono-isocyanate reactant. The crosslinkable composition of matter is useful in coating and other applications, especially cathodic electrocoating applications.

28 Claims, No Drawings

CROSSLINKABLE COMPOSITION OF MATTER-I

TECHNICAL FIELD

This invention relates to a novel composition of matter comprising certain diene-functionalized epoxy-amine adducts together with certain dieneophile-functionalized epoxy-amine adducts, which adducts are co-reactive at elevated cure temperatures. According to certain preferred embodiments, this invention relates to use of such crosslinkable compositions of matter to prevent corrosion of corrosion susceptible substrates such as ferris metal substrates and the like. This invention especially relates to aqueous coating compositions comprising such epoxy-amine adducts, which aqueous coating compositions are adapted for use in cathodic electrodeposition processes.

RELATED APPLICATIONS

This application is relted to concurrently filed application Ser. Nos. 455,718, 455,719, now U.S. Pat. No. 4,486,571, 456,067, 456,068 and 458,119, now U.S. Pat. No. 4,508,879.

BACKGROUND ART

Coating compositions are known which are suitable for application to a substrate, for example, by spraying, dipping, electrodeposition or the like, which coating compositions are then cured by baking the coated substrate at an elevated temperature. Typically, such coating compositions comprise resinous materials or blends of resinous materials, in some cases together with suitable crosslinking agent reactive with such resinous materials at elevated temperature.

In regard to electrodeposition of coatings, the process is well described in the art. Typically, an aqueous bath containing the coating composition is placed in contact with an electrically conductive anode and an electrically conductive cathode, and upon the passage of electric current (normally direct current) between the anode and the cathode, an adherent film of the coating composition is depoted. Depending upon the nature of the coating composition, the coating may be deposited at the anode or at the cathode. The process parameters vary widely. The voltage applied may vary from as low as, for example, one volt to as high as, for example, 500 volts or higher. Typically, however, the voltage used ranges from about 50 to about 400 volts.

A wide variety of electrodepositable resins are known to the skilled of the art. For example, a number of water-soluble, water-dispersable, or water-emulsifiable polycarboxylic acid resins can be electrodeposited. Some of these resins include, for example, reaction products or adducts of a drying oil or semi-drying oil fatty acid ester with a dicarboxylic acid or anhydride; interpolymers of a hydroxyalkyl ester of an unsaturated carboxylic acid, unsaturated carboxylic acid, and at least one other ethylenically unsaturated monomer; alkyd-amine vehicles, that is vehicles containing an alkyd resin and an amine-aldehyde resin; and mixed esters of resinous polyols. In U.S. Pat. No. 3,991,028 to Irwin et al, electrodepositable compositions are disclosed which comprise a water-dispersion of a hydrolyzed polyepoxide in combination with an interpolymer of a hydroxyalkyl ester, an unsaturated acid and at least one other monomer, and an amine-aldehyde resin. The use of a hydrolyzed polyepoxide is said to provide improved properties and to avoid agglomeration of the coating composition. In U.S. Pat. No. 4,026,855 to Parekh et al, a coating composition is disclosed to be adaptable for use in electrodeposition or as a water-based coating for application by spray or dip coating methods. The composition comprises an aqueous dispersion of (A) an ungelled modified crosslinking agent comprising certain aminoplast crosslinking agent modified by reaction with a non-resinous compound containing hydroxyl-group containing carboxylic acid, and (B) a water-dispersable non-gelled polymeric material carrying a cationic charge and containing at least one class of reactive groups selected from carboxyl groups, alcoholic hydroxy groups and amide groups and also containing amino groups, and (C) an acid solubilizer. In U.S. Pat. No. 4,033,917 to Sekmakas et al, certain copolymers of polyethylenically unsaturated epoxy-amine adducts are disclosed and also stable aqueous dispersions containing same and also the electrodeposition of such aqueous dispersions at the cathode of a unidirectional electrical system. Specifically, amine functional polymers dispersable in water with the aid of a solublizing acid are said to be provied by copolymerizing (A) certain ethylenically unsaturated hydroxy functional amine adduct free of epoxy groups; and (B) copolymerizable monoethylenically unsaturated monomers, a portion of which is amine-functional. The copolymer is said to be stably dispersable in water at certain pH and to be electrodepositable at the cathode, optionally together with an aminoplast curing agent to provide coatings which can be cured, usually by exposure to elevated temperature. U.S. Pat. No. 3,471,388 to Koral is directed to a cathodic electrocoating composition which incorporates an aminoplast crosslinker (e.g., butylated melamine) with an aminated polymer containing hydroxy groups. Numerous suitable hydroxy-containing aminated polymers are suggested which have capability to crosslink with an aminoplast crosslinking agent. One such suggested polymer is the reaction product of a poly-functional amine with a poly-functional epoxy compound. The polyhydroxy polymers are said to be disperable in water upon addition of suitable acid such as acetic acid.

Additional teaching directed to coating compositions suitable for use in electrocoating processes is provided in U.S. Pat. No. 4,159,233 to Tinge et al; U.S. Pat. No. 4,057,523 to Blank; U.S. Pat. No. 4,182,831 to Hicks; U.S. Pat. No. 4,192,932 to Dickie, which patent is assigned to the assignee of the present application; U.S. Pat. No. 4,192,929 Bloomfield, which patent is assigned to the assignee of the present application; U.S. Pat. No. 4,202,746 to Lee et al; and U.S. Pat. No. 4,072,536 to Otsuki et al.

It is a general objective of the present invention to provide a crosslinkable composition of matter adaptable for use in coating compositions, including coating compositions adapted for use in electrodeposition processes, and also for use in the manufacture of low pressure laminates, adhesives, molding compounds and textile treating resins. It is a further objective of the invention to provide solvent-based coating compositions and water-based coating compositions applicable to a substrate by spray or dip coating or the like.

One particular objective of the invention is to provide a crosslinkable coating composition comprising an aqueous dispersion of crosslinkable resins, which coating composition is adapted for use in the electrodeposition of coatings onto electrically conductive substrates, in particular, crosslinkable coating compositions adapted for use in the cathodic electrodeposition of coatings, especially corrosion resistent primer coatings on automotive vehicle body panels. Additional objects and aspects of the present invention will be apparent from the following description thereof.

DISCLOSURE OF THE INVENTION

The present invention provides a novel crosslinkable composition of matter, which composition comprises:

A. substantially gel-free diene-functionalized epoxyamine adduct, preferably of number average molecular weight about 500–7000, comprising the reaction product of (i) first polyhydroxy functional epoxy-amine reactant comprising the reaction product of polyepoxy reactant having an average of at least about 2 epoxy groups per molecule with secondary amine reactant having a total of less than about 20 carbons per amino nitrogen, wherein each hydroxy group, if any, of the secondary amine is removed at least 1 carbon from each amino nitrogen, with (ii) diene functional mono-isocyanate reactant; and B. subtantially gel-free dieneophile-functionalized epoxy-ammine adduct, preferably of number average molecular weight about 500–7000, comprising the reaction product of (i) second polyhydroxy functional epoxy-amine adduct reactant comprising the reaction product of polyepoxy reactant having an average of at least about 2 epoxy groups per molecule with secondary amine reactant having a total of less than about 20 carbons per amino nitrogen, wherein each hydroxy group, if any, of the secondary amine is removed at least 1 carbon from each amino nitrogen, with (ii) dieneophile functional mono-isocyanate reactant.

The crosslinking composition of the invention is particularly useful in coating compositions and according to one preferred embodiment further discussed below can be adapted for use in electrodeposition coating processes. Crosslinkable compositions provided by the invention may also be used in the manufacture of low pressure laminates, adhesives, molding compounds and textile treating resins. According to a significantly advantageous aspect of the invention, the cure rate and storage stability of the crosslinkable, heat curable composition is readily controllable as further described below through selection of diene and dieneophile resin structure. In addition, the crosslink density in the cured composition can be easily and precisely controlled by suitable selection of epoxy amine resin or by varying the stoichiometry of the reaction between the epoxy amine resin and the diene functional mono-isocyanate reactant used to make the diene-functionalized epoxy-ammine adduct or by varying that of the reaction to make the dieneophile-functionalized epoxy-amine adduct.

In regard to coating compositions, the crosslinkable compositions of the present invention are particularly adaptable for use in processes for the cathodic electrodeposition of heat curable coatings, especially highly alkali resistant primer coatings on automotive vehicle body panels. In such application the coatings provided by the invention are found to be highly resistant to solvents and humidity and to provide exceptional corrosion protection for the underlying substrate. The invention is particularly advantageous in that the novel cure chemistry allows for low temperature curing of the coating. Such crosslinkable composition of the invention comprises:

A. substantially gel-free diene-functionalized epoxyamine adduct, at least partially neutralized with a solubilizing acid, typically is an organic acid such as, for example, acetic acid or the like, which diene-functionalized adduct comprises the reaction product of:

(i) first polyhydroxy functional epoxy-amine reactant of number average molecular weight about 300–10,000 comprising the reaction product of polyepoxide reactant having an average of at least about two epoxy groups per molecule, with secondary amine reactant having a total of less than about 20 carbons per amino nitrogen, wherein each hydroxy group, if any, of the secondary amine is removed at least 1 carbon from each amino nitrogen, such as, for example, diethanolamine, with (ii) diene functional mono-isocyanate reactant; and B. substantially gel-free dieneophile-functionalized epoxy-amine adduct, at least partially neutralized with solubilizing acid, which dieneophile-functionalized adduct comprises the reaction product of (i) second polyhydroxy functional epoxy-amine reactant of number average molecular weight about 300–10,000 comprising the reaction product of polyepoxide reactant having an average of at least about two epoxy groups per molecule, with secondary amine reactant having a total of less than about 20 carbons per amino nitrogen, wherein each hydroxy group, if any, of the secondary amine is removed at least 1 carbon from each amino nitrogen, with (ii) dieneophile functional mono-isocyanate reactant; which at least partially neutralized diene-functionalized epoxy-amine adduct and dieneophile-functionalized epoxy-amine adduct are dispersed together in aqueous solvent.

Such coating composition will deposit a heat curable coating at the cathode in an electrodeposition coating process according to techniques well known to the skilled in the art. Other features and advantages of the present invention will become more apparent from the following detailed description including the preferred embodiments and best mode of the invention.

DETAILED DESCRIPTION OF THE INVENTION

Diene-Functionalized Epoxy-Amine Adduct

The first essential component of the crosslinkable composition of the invention is the diene-functionalized epoxy-amine adduct. This component comprises the reaction product of certain polyhydroxy functional epoxy-amine reactant with diene functional mono-isocyanate reactant. The polyhydroxy epoxy-amine reactant can be formed in non-aqueous medium by reacting any of certain secondary amines with a di- or polyepoxide, that is, a polyepoxide having an average of at least about two epoxy groups per molecule. The polyepoxide is preferably free of carboxy ester moieties linking the epoxide groups, since such carboxy ester-free polyepoxides have been found to provide cured coatings according to the invention which are significantly more alkali resistant and provide significantly enhanced corrosion protection to the underlying substrate.

One class of suitable polyepoxides includes the reaction products of di- or polyhydric, mono-, di- or polycyclic compounds with epihalohydrins of the formula

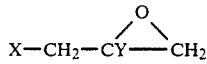

wherein X is halogen such as chloro and Y is hydrogen or lower alkyl such as, for example, methyl or ethyl, which epihalohydrin reaction products are exemplified by straight chain epoxy terminated compounds containing glycidyl ether groups such as bis-phenol A-epichlorohydrin reaction products. These are commercially available as, for example, Epon 828, 1001 or 1004 (trademarks) marketed by Shell Chemical Company, Houston, Tex., U.S.A. Such products contain aromatic groups, such as benzene nuclei at a preferred average of at least about one, more preferably for this invention at least about two, for each terminal epoxy group. Especially suitable are bis-phenol A epichlorohydrin reaction products comprising in major amounts up to 10 or more bis-phenol moieties within the epichlorohydrin reaction product backbone, for example, those of number average molecular weight up to about 8000, preferably 700–6000.

Other suitable polyepoxides include, for example, the Novolac epoxy resins, e.g. Epon 152 and 154 (trademarks) marketed by Shell Chemical Company, Houston, Tex., U.S.A. These polyepoxy resins include epoxidized products of phenol formaldehyde resins that contain terminal glycidyl ether groups from aromatic moieties.

Aliphatic, including cycloaliphatic, epoxy compounds having, on the average, at least about two epoxy groups per molecule may also be employed. Such aliphatic epoxy compounds include epihalohydrin and aliphatic di- or polyols such as glycol reaction products, epoxidized polybutadienes, vinylcyclohexenedioxide and dipentene dioxide. Still further, hydrogenated bis-phenol A epichlorohydrin products may also be employed.

In one preferred embodiment, the polyepoxide comprises relatively high molecular weight (e.g. number average above about 700) epoxy compound having hydrophobic groups such as, for example, the reaction product of epihalohydrin with diol, e.g. bis-phenol a. These have been found to advantageously provide enhanced moisture resistance to the cured coatings as compared to lower molecular weight epoxy compounds made in this way. Alternatively, as will be more fully described hereinafter, certain lower molecular weight epoxy compounds may be reacted with secondary alkanolamines to provide epoxy amine reaction products that similarly provide enhanced moisture resistance. Preferably, however, the epoxy reactant comprises higher molecular weight epoxy compounds such as those bis-phenol A-epichlorohydrin reaction products having at least about 25 mole percent, more preferably at least about 75 mole percent, constituent compounds that have two or more, preferably about 3–10 aromatic groups per epoxy group.

Numerous additional suitable polyepoxide materials are commercially available or readily prepared using well known techniques and commercially available starting materials, and these will be apparent to the skilled of the art in view of the present disclosure. Compatible mixtures of any of these epoxy compounds also are suitable.

The amine reactant preferably comprises secondary amine having a total of up to about 20 carbons per amine nitrogen. More preferably at least about 75 mole percent of the amine reactant comprises at least one and preferably two primary hydroxyl groups, each hydroxyl group on a carbon atom at least one carbon removed from any amino nitrogen. Preferred secondary amine reactants include, for example, dialkylamine, dialkanolamine, N-alkylaniline and the like and a compatible mixture of any of them, wherein each alkly moiety and each alkanol moiety has from one to about ten carbons, more preferably one to about six carbons. Most preferred are the lower dialkanolamines, especially diethanolamine, in view of their ready commercial availability, low cost, and ease of reaction with the preferred polyepoxides. While not wishing to be bound by theory, it will be understood by the skilled in the art that the amine/epoxide reaction generates an hydroxyl group in the epoxy-amine adduct reaction product. Each such hydroxyl group of the epoxy-amine reaction product can react with an isocyanate functionality of the diene functional mono-isocyanate reactant. In addition, each hydroxyl functionality contributed to the epoxy-amine adduct by an alkanol moiety of the secondary amine will be available for reaction with the mono-isocyanate mono-diene functional reactant. Accordingly, it will be understood that, as one significant advantage of the present invention, the degree of diene-functionalization of the diene-functionalized epoxy-amine adduct can be controlled to a large extent by selection of the secondary amine or mixture of secondary amines. Thus, for example, the diene-functionalized epoxy-amine adduct will comprise more diene functionality per molecule if dialkanol amine is employed than if dialkylamine is employed. This assumes, of course, that near stoichiometric amounts of diene functional mono-isocyanate reactant is employed in reaction with the polyhydroxyl functional epoxy-amine adduct. In general, a greater degree of diene-functionalization (assuming a corresponding degree of dieneophile-functionalization of the second essential component of the composition of the invention, that is, the dieneophile-functionalized epoxy-amine adduct) will result in a cured coating having a greater degree of crosslinking with corresponding physical properties. While it will be within the ability of those skilled in the art in view of this disclosure to select secondary amines suitable to generate a composition of the invention well adapted to a particular application, it has been found that diethanolamine provides generally superior coatings and, as mentioned above, is generally most preferred. If less than stoichiometric amounts of diene functional mono-isocyanate reactant is employed and/or if mixed secondary amines are employed in reaction with the polyhydroxy epoxy-amine reactant, then a mixed reaction product will result which will, in general, function in a manner consistent with the foregoing description.

According to one embodiment of the invention, combinations of primary and secondary amines can be employed with lower molecular weight polyepoxides to increase the molecular weight of the epoxy-amine reaction product. However, secondary mono-amines are preferred, with diethanolamine being most preferred.

A class of preferred hydroxy functional amine reactants includes those of the general formula:

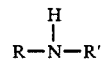

wherein R and R' are independently straight or branched chain monovalent aliphatic moieties of up to about 10 carbons each, providing that at least one and preferably both R and R' is substituted by hydroxy on a primary carbon atom that is not adjacent to any amino nitrogen. R and R' can also form part of a ring compound, such as six membered ring. More preferably, R and R' are independently alkyl and desirably up to 7 carbons each, even more desirably up to 4 carbons each.

The polyepoxide and amine reactants are reacted at conditions that allow opening of the epoxy ring by amino nitrogen and provide a gel-free reaction product. The reaction of the epoxy functionality with secondary amine can be expected to yield tertiary amino groups, whereas reaction with primary amines can be expected to yield secondary amino groups which may undergo further reaction with an unreacted epoxy functionality of the same or more probably of another polyepoxide molecule, resulting in chain extension.

Suitable reaction conditions and techniques are well known to the skilled of the art and will be apparent from the present disclosure. Thus, for example, the reaction medium preferably comprises non-aqueous medium that may be of diverse but preferably polar character and serves to maintain contact of reactants, control reaction speed, maintain desirable viscosity and other functions well known in the art. Thus, suitable solvents and diluents for the reaction medium include aromatic and aliphatic hydrocarbons, halides, ethers, ketones such as methyl amyl ketone, n-amyl ether, xylene, oxygenated solvents such as cellosolves, for example butyl cellosolve acetate, hexyl cellosolve and the like, carbitols for example carbitol acetate, and the like including mixtures of these.

Elevated reaction temperatures may be employed to facilitate reaction between the polyepoxide reactant and the amine reactant and the reaction may be conducted stepwise. The reactants are used preferably in stoichiometric amounts. That is, it is preferred that sufficient secondary amine reactant be used to react substantially all epoxy functionality of the polyepoxide reactant. More specifically, for example, about 0.9–1.0 equivalent secondary amine functionality is reacted with about 1 to 1.1 equivalent epoxide functionality to yield polyhydroxy epoxy-amine adduct which is substantially free of unreacted epoxy functionality. More specifically, the polyhydroxy epoxy-amine adduct reaction product should contain less than 20% of the original unreacted epoxy groups, more desirably less than about 10% and most preferably less than about 5% unreacted epoxy groups, based on the number originally present.

The diene-functionalized epoxy-amine adduct component of the crosslinkable composition of the invention is the reaction product of the above described polyhydroxy epoxy-amine reactant with diene functional mono-isocyanate reactant. That is, the polyhydroxy epoxy-amine adduct is diene-functionalized by reacting same with a diene-functional isocyanate. Suitable diene functional isocyanates are readily prepared employing readily available reactants according to methods apparent to the skilled of the art in view of the present disclosure. In general, mono-diene-functional mono-isocyanate reactants are preferred in view of their ease of preparation and most preferred are those of formula O=C=N—R—A, wherein R is a bivalent hydrocarbon linking moiety which is substantially unreactive with isocyanate functionality and with substituent A, and A is a monovalent olefinic moiety having 1,3-conjugated double bonds according to formula I:

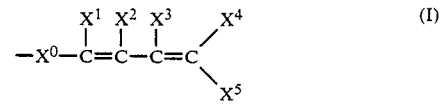

wherein:

$X^0$ is 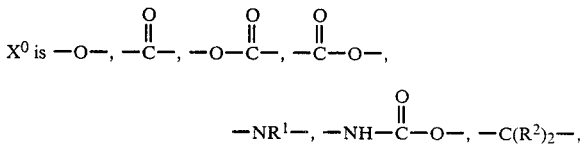

$$-NR^1-, \quad -NH-\overset{O}{\overset{\|}{C}}-O-, \quad -C(R^2)_2-,$$

or the like, wherein $R^1$ is hydrogen, straight, branched or cyclo alkyl, aryl, arylalkyl or the like, and each $R^2$ is the same or different and each is hydrogen, hydroxy, carboxy, straight, branched or cyclo alkyl, aryl arylalkyl, or the like, each alkyl, aryl and arylalkyl moiety of $R^1$ and $R^2$ being unsubstituted or mono- or poly-hydroxy substituted or mono- or poly-amino substituted; and $X^1$, $X^2$, $X^3$, $X^4$ and $X^5$ are the same or different and each is hydrogen, hydroxy, carboxy, amino, straight, branched or cyclo alkyl, aryl, arylakyl, cyano, nitro, or the like, or $X^1$ and $X^5$ together are alkylene, —O—, —NR$^1$— wherein R$^1$ is as defined above, or like divalent group (resulting in a cyclic diene moiety), each alkyl, aryl, arylalkyl and alkylene moiety of $X^1$, $X^2$, $X^3$, $X^4$ and $X^5$ being unsubstituted or mono-, or poly-hydroxy substituted or mono- or poly-carboxy substituted or mono- or poly-amino substituted. According to one most preferred embodiment, diene moiety A is:

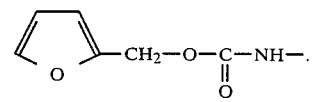

One group of preferred diene functional isocyanates includes the reaction products of one molar equivalent of suitable diisocyanate with one molar equivalent of diene reactant selected preferably from the group consisting of monohydroxy functional diene reactants, monoamino functional diene reactants and like mono- and polydiene functional reactants having a single functionality substantially reactive with the diisocyanate reactant, or a compatible mixture of any such diene functional reactants. Exemplary preferred diene functional reactants include those of molecular weight about 30–500 such as furfuryl alcohol, furfuryl amine, 2-hydroxymethyl-1,3-butadiene, 2-aminomethyl-1,3-butadiene and the like. Also suitable are polydiene-functional reactants, of which many are readily prepared employing commercially available reactants according to methods apparent to the skilled of the art in view of the present invention. A polydiene functional reactant may be preferred where the rate of reaction is relatively slow between the particular diene and dieneophile functionality of the crosslinkable composition, to improve the cure response of the composition.

Suitable organic diisocyanate reactants are readily commercially available and include many known to the skilled of the art such as, for example, phenylene diisocyanates, toluene diisocyanate, isophorone diisocyanates, diisocyanatoalkane wherein the alkylene moiety has, preferably, from about three to about ten carbons, for example, 1,6-hexane diisocyanate, or the like or a compatible mixture of any of them. Most preferably the organic diisocyanate has a molecular weight less than about 250. If corrosion resistance is of primary concern in the cured coating, for example in the case of an automotive vehicle primer or topcoat, it may be preferred to use an aliphatic diisocyanate, for example, isophorone diisocyanate and 1,6-hexane diisocyanate. Aromatic diisocyanates provide suitable coatings, however, and may be preferred in view of their lower cost.

The diene reactant and the diisocyanate reactant can be reacted according to well known techniques. Accordingly, approximately one molar equivalent of diene reactant can be added to a suitable amount of diisocyanate under reaction conditions. Well known techniques can be employed to maximize the yield of the diene functional mono-isocyanate reaction product, such as, for example, adding the diene reactant slowly to an excess of the organic diisocyanate under reaction conditions.

The diene-functionalized epoxy-amine adduct component of the crosslinkable composition of the invention is the reaction product of diene functional mono-isocyanate reactant with the above described polyhydroxy epoxy-amine adduct reactant. The reactants are used preferably in stoichiometric amount. That is, preferably sufficient diene functional mono-isocyanate reactant is employed to react substantially all hydroxy functionality of the polyhydroxy epoxy-amine adduct reactant. The reaction product, that is, the diene-functionalized epoxy-amine adduct, comprises, on average, at least about two diene moieties per molecule and substantially no hydroxy functionality. Each diene moiety will be available for reaction with a dieneophile moiety of the dieneophile-functionalized epoxy-amine adduct during heat curing of the composition of the present invention. More preferably, the diene-functionalized epoxy-amine adduct will provide, on average, about three or more, such as about 3–20 diene moieties per molecule. According to an alternative embodiment of the invention, substantially less than all hydroxy groups of the polyhydroxy epoxy-amine are reacted. The resulting mixed reaction product would introduce hydroxy groups into the crosslinkable composition of the invention. In this embodiment, the crosslinkable composition could advantageously further comprise suitable crosslinking agent reactive with such hydroxy groups. Numerous such crosslinking agents are well known to the skilled of the art and include, for example, any of a variety of aminoplast crosslinking agents, for example, partially alkylated melamines (melamines formaldehyde resins modified by alcohols), for example, partially methylated melamines and butylated melamines, polyalkyl ethers of the polymethylol melamines, for example, hexamethoxy methylmelamine; urea formaldehyde condensate modified by alcohol, for example, paraformaldehyde and trioxane; polymethylol compounds of hexamethylene diurea; adipic acid dimethylol amide and methylol ether thereof; tetramethylolhydrazodicarbonamide; polymethylol compounds of polycaprolactam and methylol ethers thereof; and the like or compatible mixtures of any of them. Other suitable crosslinking agents will be apparent to the skilled of the art in view of the present disclosure. Butylated melamines are preferred since they are readily commercially available and provide suitable crosslinking reactivity with the epoxy-amine adducts of the invention.

Dieneophile-Functionalized Epoxy-Amine Adduct

This second essential component of the crosslinkable compositions of the invention is the reaction product of the above-described polyhydroxy epoxy-amine adduct reactant with dieneophile functional mono-isocyanate reactant. That is, the polyhydroxy epoxy-amine reaction is dieneophile functionalized by reacting same with a dieneophile functional mono-isocyanate. Suitable dieneophile functional isocyanates are readily prepared employing readily available reactants according to methods apparent to the skilled of the art in view of the present disclosure. In general, mono-dieneophile functional mono-isocyanate reactants are preferred in view of their ease of preparation and most preferred are those of formula O=C=N—R'—B, wherein R' is a bivalent hydrocarbon linking moiety which is substantially unreactive with isocyanate functionality and with substituent B, and B is a dieneophile moiety reactive at elevated cure temperature with the aforesaid diene moiety A. The dieneophile moiety B is preferably of molecular weight about 30–200. Preferred dieneophile moieties include those according to formulas II-A to II-H:

 (II-A)

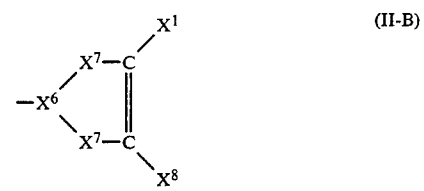 (II-B)

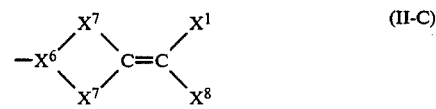 (II-C)

 (II-D)

 (II-E)

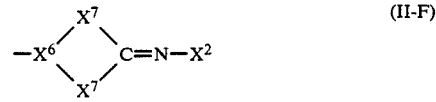 (II-F)

 (II-G)

 (II-H)

or the like, wherein $X^0$, $X^1$, and each $X^2$ are the same or different as previously defined for formula I; $X^6$ is

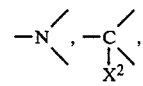

unsubstituted, or mono- or poly-hydroxy substituted or mono- or poly-carboxy substituted or mono- or poly-amino substituted alkanyl-ylidene of 2 or 3 carbons;

each $X^7$ is the same or different and each is a covalent bond, —O—,

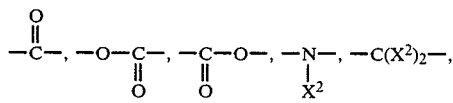

or the like; $X^8$ is hydrogen, hydroxy, carboxy, amino, straight or branched or cyclo-alkyl, aryl, arylalkyl, cyano, nitro or the like, each alkyl, aryl and arylalkyl moiety of $X^8$ being unsubstituted, mono- or poly-hydroxy substituted or mono- or poly-carboxy substituted or mono- or poly-amino substituted; or $X^1$ and $X^8$ together are —$(CX^2)_n$— wherein n is an integer from about 3 to about 7, preferably about 3 to 4. Accordingly to one most preferred embodiment, dieneophile moiety B is:

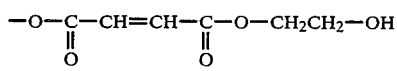

One group of preferred dieneophile functional mono-isocyanate reactants includes the reaction products of one molar equivalent of suitable diisocyanate with one molar equivalent of dieneophile reactant selected preferably from the group consisting of monohydroxy functional dieneophile reactants, monoamino functional dieneophile reactants and like mono- and poly-dieneopohile functional reactants having a single functionality substantially reactive with the diisocyanate reactant, or a compatible mixture of any of them. Exemplary preferred dieneophile functional reactants include those of molecular weight about 50–500 such as mono-hydroxy or monoamino or like isocyanate-reactive ene reactants, for example, methylolmaleimide, hydroxypropyl-methacrylate, allyl alcohol, allyl amine, hydroxyethyl-methacrylate, hydroxyethylacrylate and the like and a compatible mixture of any of them. Also suitable for reaction are poly-dieneophile functional reactants, of which many are readily prepared exploying commercially available reactants according to methods apparent to the skilled of the art in view of the present disclosure. A polydieneophile reactant may be preferred, for example, where the rate of reaction is relatively slow between the particular diene and dieneophile functionality of the crosslinkable composition, to improve the cure response of the composition.

Suitable and preferred diisocyanates are those disclosed above in connection with the synthesis of diene functional isocyanate. The dieneophile reactant and the diisocyanate reactant can be reacted according to well known techniques. Accordingly, approximately one molar equivalent of the dieneophile reactant can be added to the diisocyanate under reaction conditions. Well known techniques can be employed to maximize the yield of the dieneophile functional mono-isocyanate reaction product, such as, for example, adding the dieneophile reactant slowly to an excess of the organic diisocyanate under reaction conditions.

The dieneophile functionalized epoxy-amine adduct component of the crosslinkable composition of the invention is the reaction product of dieneophile functional mono-isocyanate reactant with the above-described polyhydroxy epoxy-amine adduct reactant.

The reactants are used preferably in stoichiometric amount. That is, preferably sufficient dieneophile functional mono-isocyanate reactant is employed to react substantially all hydroxy functionality of the polyhydroxy epoxy-amine adduct reactant. The reaction product, that is, the dieneophile-functionalized epoxy-amine adduct, comprises, on average, at least about two dieneophile moieties per molecule and preferably substantially no hydroxy functionality. Each dieneophile moiety will be available for reaction with a diene moiety of the diene-functionalized epoxy-amine adduct component of the composition during curing at elevated temperature. More preferably, the dieneophile functionalized epoxy-amine adduct will provide, on average, about three or more, such as about 3–20 dieneophile moieties per molecule.

According to an alternate embodiment, the dieneophile-functionalized epoxy-amine adduct provides unreacted hydroxy groups in the composition of the invention. According to this embodiment, as described above in connection with hydroxy functional diene-functionalized epoxy-amine adduct, crosslinkable composition of the invention would preferably further comprise suitable crosslinking agent reactive with such hydroxyl groups. Suitable and preferred crosslinking agents include those described above in connection with such hydroxy functional diene-functionalized epoxy-amine adduct.

The diene-functionalized epoxy-amine adduct and the dieneophile-functionalized epoxy-amine adduct are employed in the crosslinkable coating composition of the invention preferably in approximately stoichiometric amount. That is, it is preferred that one molar equivalent weight of the former be employed together with about one molar equivalent weight of the latter. In general, these two components can be used in relative amounts of about 1.8 to about 1:1.2 molar equivalents respectively. If either or both of these components comprise unreacted hydroxy functionality, then crosslinking agent can be used in near stoichiometric amount, that is, up to an amount sufficient to react substantially all such hydroxy functionality, to improve cure response of the composition. If an aminoplast crosslinking agent is employed, then it may be advantageous in certain embodiments or for certain applications to include in the composition any of a variety of compatible catalysts known to the skilled of the art to catalyze the crosslinking reaction, for example, paratoluenesulfonic acid, phosphor acid, phenol acid phosphate, butyl maleate and the like or a compatible mixture of any of them. In addition, a flow control agent, for example, polybutylacrylate; a wetting agent, for example, silicone; pigments; a pigment dispersent; and/or a corrosion inhibitor, for example, chromate pigment, several of all of which are known to the skilled of the art, may be employed in the coating compositions of the invention.

Di- and polyhydroxy compounds of diverse character may be employed also in the composition of the invention to modify the properties of the composition (i.e. the properties prior to or following cure) as well as to act as solvent, including reactive solvent, for solubilizing the crosslinking composition. Thus, for example, these compounds may impart increased flexibility or reduce cratering in spray-applied cured films of the crosslinking composition of the invention. A preferred class of hydroxy compounds includes aliphatic dihydroxy compounds, especially glycols and glycol ethers of the formula $HO(C_aH_{2a}O)_x$—$(C_bH_{2b}O)_yH$ wherein a, b, x and y are independent integers and a and b are from 2 to 6 and x and y are from 0–10 with the sum of x and y being 10. Examples include ethylene glycol, dipropylene glycol, and 1,6-hexanediol. Another class of glycols includes hydroxy terminated polybutadienes, hydrogenated bis-phenol-A, such hydroxy compounds being of generally hydrophobic character and molecular weights of about preferably 100–5000, number average. Higher boiling solvents (e.g. boiling point above about 180° C. as 190°–250° C.) that are of polar character may tend to interact with the resinous components of crosslinking composition and thereby allow higher solids content. If such hydroxy functional compounds are included in the composition of the invention, then crosslinking agent reactive with hydroxy functionality, such as described above, should be employed, preferably in stoichiometric amount.

As noted above, pigments may be used in the primer compositions of the invention in accordance with known techniques. Pigments are employed most typically, for example, to enhance the efficacy of compositions employed as coating compositions over corrosion-susceptible substrates. Chromate pigments, in particular, have been used to enhance corrosion protection. It is, however, a significant advantage of the present invention that chromate pigments need not be employed in compositions employed as such coating compositions over corrosion susceptible substrates. Cured coating of the invention are highly alkali resistant and provide excellent corrosion protection even without chromate pigments. Such pigments and others can be employed, however, and may be desirable for aesthetic purposes. Exemplary pigments include titanium dioxide, silica, carbon black, and barytes and are employed typically at pigment:binder weight ratios of about 40:60 to about 60:40.

While not wishing to be bound by theory, it is presently understood that during the curing process at elevated temperature, the diene functionality and the dieneophile functionality react with each other through Diels Adler cycloaddition chemistry. Taking the dieneophile functionality to be ene functionality for purposes of illustration, it is presently understood that the ene/diene reaction results in the formation of a cyclic six membered ring:

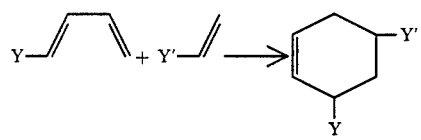

In like manner, the cycloaddition reaction of a cyclic diene with an ene moiety yields a bicyclic carbon-carbon linkage:

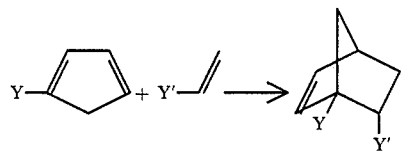

Such Diels Alder reactions have been studied and several parameters have been identified which affect reactivity. Exemplary such work is found in P. Wasserman, "Diels Alder Reactions", Elsevier Publishing Co., New York, 1965, which is incorporated herein by reference.

Such parameters are found to include most notably the selection of the substituent groups on the diene and dieneophile moieties, steric hindrance at the reaction site and molecular orientation. In this regard, it is one characterizing aspect of the present invention that the substituent groups on the diene functionality and on the dieneophile functionality of the epoxy-amine adducts employed in the compositions of the invention are selected to provide the desired degree of reactivity, that is, cure response. In particular, the degree of reactivity is increased by ene moiety substitution groups which, in net effect, are electron withdrawing, that is, which increase the electron affinity of the ene functionality double bond. Thus, for example, reactivity is increased by electron withdrawing ene substitution groups such as nitro, cyano, ester (i.e.,

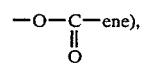

nitrile, carbonyl, straight, branched or cyclo alkyl or alkylene, arylene, aralklyene, —O—, —NR—, —S— and the like. Similarly, it will be understood by the skilled of the art in view of the present disclosure, that the shelf stability of the composition is enhanced by ene moiety substitution groups which, in net effort, are electron donating, that is, which decrease the electron affinity of the ene functionality double bond. Thus, shelf life is increased by substituent groups such as, for example, amine and ether linkages, sulfoxide, sulfone, urethane and the like.

It will be within the ability of those skilled in the art, in view of the present disclosure, to select dieneophile substituent groups which provide, in net effect, the desired compromise between shelf stability and reactivity. It generally is preferred that no electron donating group(s) be substituted directly on either carbon of the ene functionality double bond, nor on any adjacent or next adjacent atom. In certain applications, however, particularly where extended shelf life is of paramount importance, such electron donating groups can be tolerated, more preferably in conjunction with electron withdrawing group(s) of greater effect, and with sufficient reaction catalyst, higher cure temperatures, longer cure periods, or a combination thereof.

In view of the present disclosure, it will be appreciated by the skilled of the art that in accordance with the foregoing discussion, compositions of the invention are rendered more reactive by diene-functionalized epoxy-amine adducts wherein the diene moiety substitution groups are electron donating in net effect, that is, wherein the electron affinity of the diene double bonds is increased. Likewise, electron withdrawing groups on the diene moiety increase the shelf stability of the composition. It generally is preferred that no electron withdrawing group(s) be substituted directly on any carbon of either diene functionality double bond, nor on any adjacent or next adjacent atom. As noted above, however, in certain applications a composition of the invention may require extended shelf life or for some other reason call for or tolerate diene-functionalized epoxy-amine adduct comprising electron withdrawing substitution groups on the diene moiety.

Applications

As noted above, the crosslinkable composition of the invention is useful in a variety of applications including, especially, as a coating composition to provide an aesthetic and/or protective film on a substrate. In particular, the crosslinkable composition of the invention can be formulated into a variety of primer formulations including both aqueous primer formulations and non-aqueous primer formulations. Such primers can be used as coatings for bare or treated steels (e.g., conversion coated with phosphates) as well as for guide coats over previously deposited primers applied, for example, by electrodeposition. Conventional modifying ingredients can be used in such primer formulations including, for example, flow control agents, pigments, pigment dispersents, thixotropes, anit-cratering aids, photo stabilizers and the like, as indicated above.

Solvent Based Primers

Coating compositions comprising diene-functionalized epoxy-amine adduct and dieneophile-functionalized epoxy-amine adduct can be dispersed in organic solvent and applied to a substrate, for example a ferrous metal substrate, according to well known techniques such as by spray, curtain, dip and other such coating methods. For solvent-based coatings to be applied by spray application methods, the diene-functionalized epoxy-amine adduct and the dieneophile-functionalized epoxy-amine adduct are each preferably of number average molecular weight about 800-2000. It will be within the ability of those skilled in the art to determine a suitable solvent and amount of same for a given coating composition of the invention, for a given application. It will be understood that any solvent allowed to remain in the cured coating should be inert so as to avoid adverse effects upon the cured coating or upon another coating used in conjunction with it, during the curing process or thereafter. Preferably the cured coating is substantially free of solvent. Sufficient solvent is used to reduce the viscosity of the coating composition to a level suitable for application to the substrate in the desired manner. Thus, for example, for a composition to be used as a spray-applied primer coating composition, it is preferred that sufficient solvent be used to reduce the viscosity of the coating composition to about 25-35 seconds, No. 4 Ford Cup at 27° C. (80° F.).

Solvent based coating compositions according to the invention are cured by heating same to a sufficient temperature for a sufficient time to drive off the solvent and to cause reaction of the diene functionality with the dieneophile functionality and of the hydroxyl functionality, if any, with the crosslinking agent, if any. Thus, for example, a solvent based coating composition comprising the crosslinkable composition of the invention according to preferred embodiments described above, applied by spray techniques to the surface of an automotive vehicle body panel as a primer coat would be cured by heating to a temperature of about 130°–210°C. for approximately 15-30 minutes.

Water Based Coating Compositions

The crosslinkable composition of the present invention can be formulated into water based coating compositions. Accordingly, the diene-functionalized epoxy-amine adduct and dieneophile-functionalized epoxy-amine adduct each are at least partially neutralized by acid, preferably weak oganic acid such as formic, acetic which is generally preferred, latic, butryric or the like or a compatible mixture of any of them. Additional suitable neutralizing acids (often referred to as "solubilizing acid") are known to the skilled of the art and will be apparent in view of the present disclosure. The at least partially neutralized epoxy-amine adducts are dispersed into water, preferably de-ionized water for use either in spray application methods, flow coating, etc. or electrodeposition methods. Cured coatings resulting from such methods are found to provide exceptionally good flow characteristics resulting in smooth and otherwise aesthetically superior films having exceptionally good solvent and humidity resistance. The cured coatings were also found to be highly alkali resistant and thus, to provide exceptionally good corrosion protection to the underlying substrate. Water based coating compositions according to the invention can be employed in spray application techniques. Thus, for example, they can be employed as a spray-applied primer coat for automotive vehicle body panels.

Coating compositions of the invention wherein the crosslinkable composition is applied to the surface of a substrate by electrodeposition technique is a particularly preferred embodiment of the invention. According to this embodiment, the crosslinkable coating composition, as described above, is at least partially, and preferably substantially totally neutralized with solubilizing acid and thereafter dispersed into de-ionized water to a concentration of about 5-25 weight percent, more preferbly about 10-15 weight percent. The resulting water based composition is adapted for use as a cathodic electrocoat composition. That is, the coating comprising the crosslinkable resin and crosslinking agent, catalysts etc., if any, will deposit upon the workpiece acting as the cathole according to known electrodeposition systems and techniques. For coating compositions adapted for cathodic electrodeposition the diene-functionalized epoxy-amine resin is preferably of number average molecular weight about 2000-7000, and the dieneophile-functionalized epoxy-amine resin is preferably of number average molecular weight about 2000-7000.

Cathodic electrodeposition according to the present invention is done preferably at voltages of about 1-500 volts, more preferably about 200-400 volts. Subsequent to electrodeposition, the coating on the substrate is heated to above about 130° C., more preferably about 150°-210° C. for a time sufficient to effect the diene/-dieneophile reaction and the crosslinking reaction, and to drive off substantially the entire aqueous solvent content of the coating. Employing a crosslinkable composition according to preferred embodiments described above, the coating will be substantially completely cured following baking at about 158° C. for about 30 minutes. In general, it will be within the ability of those skilled in the art to select suitable electrodeposition voltage and baking temperatures and like process parameters in view of the particular application involved.

Such aqueous solvent based coating compositions can comprise a mixture of water and water compatible solvent and diluents such as ethylene glycols and alkylated glycols, for example oxygenated solvents such as Cellosolves and carbitols and the like or a compatible mixture of any of them. For use as spray primers, for example, such water based coating compositions can be formulated with high levels of water, for example, greater than about 10%, such as about 30-50% by weight, and yet cure within conventional conditions such as, for example, at temperatures above about 130° C., more preferably about 150°-210° C., in about 30 minutes or less, for example about 15–30 minutes according to preferred embodiments. Obviously, the particular time and temperatures necessary to effect curing of the coating will depend upon the particular epoxy-amine adducts employed in the coating composition and will depend upon the thickness of the coating, the use of catalysts, and like parameters familiar to the skilled of the art.

The invention will be further understood by referring to the following detailed examples. It should be understood that these examples are presented by way of illustration and not by way of limitation. Unless otherwise specified, all references to "parts" are intended to mean parts by weight.

EXAMPLE I

This example illustrates the preparation of a polyhydroxy epoxy-amine reactant from higher molecular weight Bisphenol A-epichlorohydrin epoxy resin and dialkanolamine. To a solution of 93 g (0.1 molar equivalent weight) of Epon 1004[1] (trademark) in 93 g butoxy ethyl acetate was added 10.5 (0.1 mole) diethanol amine. The reaction mixture was heated to 70°-80° C. and maintained at that temperature for four hours. The polyhydroxy epoxy-amine reaction product, shown to be epoxide free upon IR analysis by absence of 910 cm$^{-1}$ peak, was cooled to room temperature and stored.

[1] Bisphenol A-epichlorohydrin epoxy resin available from Shell Chemical Co., Houston, Tex., U.S.A.

EXAMPLE II

This example illustrates the preparation of a polyhydroxy epoxy-amine reactant from higher molecular weight Bisphenol A-epichlorohydrin epoxy resin and monoalkanolamine. Following the procedures of Example I 7.4 g (0.1 mole) of N-methyl ethanol amine is reacted with 93 g of Epon 1004[1] (trademark) in 93 g butoxy ethyl acetate. The epoxide free polyhydroxy epoxy-amine reaction product is cooled to room temperature and stored.

EXAMPLE III

This example illustrates the preparation of a polyhydroxy epoxy-amine reactant from a lower molecular weight Bisphenol A-epichlorohydrin epoxy resin and dialkanolamine. Following the procedures of Example I, 10.5 g (0.1 mole) diethanol amine is reacted with 19.0 g (0.1 molar equivalent weight) Epon 828[2] (trademark) in 93 g butoxy ethyl acetate. The epoxide free polyhydroxy epoxy-amine reaction product is cooled to room temperature and stored.

[2] Bisphenol A-epichlorohydrin epoxy resin available from Shell Chemical Co., Houston, Tex, U.S.A.

EXAMPLE IV

This example illustrates the preparation of polyhydroxy epoxy-amine reactant from low molecular weight aliphatic diepoxide and dialkanolamine, Following the procedures of Example I, 10.5 g (0.1 mole) diethanol amine is reacted with 20.2 g (0.1 molar equivalent weight) 1,4-butane diol diglycidyl ether. The epoxide free polyhydroxy epoxy-amine reaction product is cooled to room temperature and stored.

EXAMPLE V

This example illustrates the preparation of an ester-bearing polyhydroxy cyclic aliphatic epoxy-amine reactant. Following the procedures of Example I, 126 g (0.1 mole) Araldite Cy 179[3] (trademark) is reacted with 10.5 g dialkanolamine in 130 g methyl amyl ketone. The epoxide free polyhydroxy epoxy-amine reaction product is cooled to room temperature and stored.

[3] Cyclic aliphatic epoxy resin available from Ciba-Geigy Corp., Ardsley, NY, U.S.A.

EXAMPLE VI

This example illustrates the preparation of dieneophile functional mono-isocyanate reactant having a relatively less reactive dieneophile moiety. To a solution comprising 222 g (1.0 mole) isophorone diisocyanate and 1 g dibutyl tin dilaurate in 100 g methyl ethyl ketone heated to 60°-80° C. was added a solution of 70. g (1.0 mole) allyl alcohol in 73 g methyl ethyl ketone. The reaction mixture was maintained at 60°-80° C. for one hour following the addition. The dieneophile functional mono-isocyanate reaction product was cooled to room temperature and stored.

EXAMPLE VII

This example illustrates the preparation of a dieneophile functional mono-isocyanate reactant having a moderately reactive dieneophile moiety.

Step A: preparation of maleate. To a solution of 19.6 g (0.2 mole) maleic anhydride in 13.1 g methyl ethyl ketone was added 6.4 g methanol and 100 mg. triethylamine. The reaction was heated to 60°-80° C. and maintained at that temperature for about one hour and then used immediately in Step B.

Step B: preparation of substituted maleate having the structure:

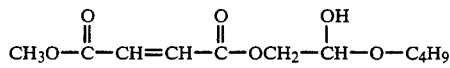

To the entire reaction mixture of Step A, at about 60° C., was added 26 g (0.2 mole) butyl glycidyl ether and 0.15 g Cordova AMC-2[4] (trademark) catalyst. The reaction mixture was again heated for about six hours until all epoxide functionality had reacted as shown by IR analysis.

[4] Available from Cordova Chemical Co., Sacramento, Calif., U.S.A.

Step C: preparation of diene functional mono-isocyanate. The procedure of Example VI was followed using the entire contents of the reaction mixture of Step B with 44 g (0.2 mole) isophorone diisocyanate and dibutyl tin dilaurate as catalyst. The dieneophile functional mono-isocyanate reaction product was cooled to room temperature and stored.

EXAMPLE VIII

This example illustrates the preparation of dieneophile functional mono-isocyanate having relatively highly reactive dieneophile moiety. Following the procedures of Example VI, 127 g (1.0 mole) methylolmaleimide was reacted with 222 g (1.0 mole) isophorone diisocyanate. The dieneophile functional mono-isocyanate was cooled to room temperature and stored.

EXAMPLE IX

This example illustrates the preparation of a polydieneophile-functionalized epoxy-amine adduct. The entire polyhydroxy epoxy-amine product of Example I was combined with 324.5 g of the dieneophile functional mono-isocyanate prepared in Example VIII.

The reaction mixture was heated to 60°–80° C. under an argon atmosphere until substantially all isocyanate functionality was reacted. The resulting polydieneophile-functionalized epoxy-amine adduct was cooled and stored for use in a coating composition according to the present invention.

EXAMPLE X

This example illustrates the preparation of cyclic diene functional mono-isocyanate. To a solution of 222. g (1.0 mole) isophorone diisocyanate and 1 g dibutyl tin dilaurate in 100 g methyl ethyl ketone was added a solution of 98 g (1.0 mole) furfuryl alcohol in 100. g methyl ethyl ketone. The rate of addition was controlled to maintain reaction temperature of 60°–80° C. Following addition of the furfuryl alcohol, the reaction mixture was maintained at 60°–80° C. by external heating for an additional hour. The cyclic diene functional mono-isocyanate reaction product was cooled to room temperature and stored at room temperature.

EXAMPLE XI

This example illustrates the preparation of acyclic diene functional mono-isocyanate. Following the procedure of Example X, 84 g (1.0 mole) 2-hydroxymethyl-1,3-butadiene is reacted with 222 g (1.0 mole) isophorone diisocyanate. The reaction temperature, however, is maintained at 30°–45° C. The acyclic diene functional mono-isocyanate reaction product is cooled and stored at room temperature.

EXAMPLE XII

This example illustrates the preparation of polydiene-functionalized epoxy-amine adduct. The entire reaction product according to the procedures of Example I was combined with 260. g of the cyclic diene functional mono-isocyanate prepared according to Example X. The reaction mixture was heated to 60°–80° C. and maintained at that temperature until substantially all isocyanate functionality had reacted, as shown by IR analysis. The resulting polydiene-functionalized epoxy-amine adduct was cooled to room temperature and stored for use in a coating composition according to the present invention.

EXAMPLE XIII

This example illustrates a typical pigment package suitable for use in a coating composition according to the present invention.

Pigment Package

Aluminum silicate: 7.0 g
White lead: 5.6 g
Carbon Black: 1.0 g

EXAMPLE XIV

This example illustrates the preparation of a solvent-based primer coating composition according to the present invention. One half of the entire polydiene-functionalized epoxy-amine adduct product of Example XII is combined with the pigment package of Example XIII and the resulting mill base is ground until a Hegman Gauge reading of at least 7 is obtained. The remaining portion of the polydiene-functionalized epoxy-amine adduct of Example XII is added and the resulting mill base is combined with the entire polydieneophile-functionalized epoxy-amine adduct product of Example IX. The composition is thoroughly mixed, its viscosity is reduced with methyl ethyl ketone to 30–40 sec., No. 4 Ford Cup (27° C.), and it is filtered. The resulting solvent-based composition is suitable for use by spray application methods as a primer coat for corrosion protection of an underlying substrate.

EXAMPLE XV

This example illustrates the use of a crosslinkable composition of matter according to the present invention. The solvent-based primer composition of Example XIV is applied by spray technique to bare, unpolished steel panels and cured by baking at 180° C. for 30 minutes. The cured coating provides good resistance to corrosion of the steel substrate.

EXAMPLE XVI

This example illustrates the preparation of an aqueous solvent-based cathodic electrodepositable coating composition according to the present invention. The solvent present with the polydieneophile-functionalized epoxy-amine adduct prepared according to Example IX is replaced by coupling solvent to facilitate dispersion into aqueous medium suitable for electrodeposition. Accordingly, the dieneophile-functionalized epoxy-amine adduct of Example IX is combined with 50. g of butyl Cellosolve acetate and the resulting mixture is distilled until a solids content of 80% by weight is obtained. The solvent present with the polydiene-functionalized epoxy-amine adduct prepared according to Example XII is replaced by coupling solvent to facilitate dispersion into aqueous medium suitable for electrodeposition. Accordingly, the polydiene-functionalized epoxy-amine adduct of Example XII is combined with 50. g of butyl Cellosolve acetate and the resulting mixture is distilled until a solids content of 80% by weight is obtained. One half of the resulting polydiene-functionalized epoxy-amine solution is combined with the pigment package of Example XIII and the resulting mill base is ground until a Hegmen Gauge reading of at least 7 is obtained. The remaining portion of the polydiene-functionalized epoxy-amine adduct solution is added and the resulting mill base is combined with the aforesaid polydieneophile-functionalized epoxy-amine adduct solution. The mixture is partially neutralized with 60 g glacial acetic acid and is slowly dispersed into 1500 g of deionized water. The resulting aqueous formulation is filtered. The aqueous solvent-based composition is suitable for use in cathodic electrodeposition coating operations to deposit a primer coat for corrosion protection of a suitable substrate.

EXAMPLE XVII

This example illustrates the use of a crosslinkable composition of matter according to the present invention. The aqueous solvent-based composition of Example XVI is applied by cathodic electrodisposition methods, at 100–300 volts, to bare, unpolished steel panels. The composition is cured by baking the coated panels at 180° C. for 30 minutes. The cured coating is found to provide good resistance to corrosion of the underlying substrate.

In view of this disclosure, many modifications of this invention will be apparent to those skilled in the art. It is intended that all such apparent modifications fall within the true scope of this invention and be included within the terms of the appended claims.

INDUSTRIAL APPLICABILITY

It will be apparent from the foregoing that this invention has industrial applicability as a coating composition, especially as a cathodic electrodeposition primer coating composition for sheet steel and the like used in automotive vehicles, household appliances and the like, and other applications where the coating composition desirably has excellent storage stability and the cured coating desirably provides excellent humidity and solvent resistance to protect the substrate against corrosion, wear and the like.

What is claimed is:

1. A crosslinkable composition of matter, which composition comprises:
    A. substantially gel-free conjugated diene-functionalized epoxy-amine adduct, comprising the reaction product of (i) first polyhydroxy functional epoxy-amine reactant comprising the reaction product of polyepoxy reactant having an average of at least about 2 epoxy groups per molecule with secondary amine reactant having a total of less than about 20 carbons per amino nitrogen, wherein each hydroxy group, if any, of the secondary amine is removed at least 1 carbon from each amino nitrogen, with (ii) conjugated diene functional mono-isocyanate reactant; and
    B. substantially gel-free dieneophile-functionalized epoxy-amine adduct, other than said conjugated diene functionalized epoxy-amine adduct, comprising the reaction product of (i) second polyhydroxy functional epoxy-amine reactant comprising the reaction product of polyepoxy reactant having an average of at least about 2 epoxy groups per molecule with secondary amine reactant having a total of less than about 20 carbons per amino nitrogen, wherein each hydroxy group, if any, of the secondary amine is removed at least 1 carbon from each amino nitrogen, with (ii) dieneophile functional mono-isocyanate reactant.

2. The crosslinkable composition of matter of claim 1, wherein the polyepoxy reactant for at least one of said first and second polyhydroxy functional epoxy-amine reactants is selected from the group consisting of Bisphenol A-epichlorohydrin epoxy resin, Novolak epoxy resin, aliphatic epoxy resins and a compatable mixture of any of them.

3. The crosslinkable composition of matter of claim 1, wherein the polyepoxy reactant for at least one of said first and said second polyhydroxy functional epoxy-amine reactants has number average molecular weight about 700–8000.

4. The crosslinkable composition of matter of claim 1, wherein said secondary amine reactant for at least one of said first and said second second polyhydroxy functional epoxy-amine reactant is selected from the group consisting of dialkylamine, dialkanolamine, N-alkylaniline and a compatible mixture of any of them, wherein each alkyl moiety and each alkanol moiety has from one to about ten carbons.

5. The crosslinkable composition of matter of claim 3, wherein said secondary amine reactant for at least one of said first and said second polyhydroxy functional epoxy-amine reactant consists essentially of diethanolamine.

6. The crosslinkable composition of matter of claim 1, wherein said diene functional mono-isocyanate reactant comprises the reaction product of (a) diisocyanate reactant in approximately one-to-one molar ratio with (b) diene reactant selected from the group consisting of monohydroxy functional diene reactant, monoamino functional diene reactant and a compatible mixture of any of them.

7. The crosslinkable composition of matter of claim 6, wherein said diisocyanate reactant is selected from the group consisting of phenylene diisocyanate, toluene diisocyanate, isophorone diisocyanate, diisocyanatoalkane wherein the alkyl moiety has about three to about ten carbons and a compatible mixture of any of them.

8. The crosslinkable composition of matter of claim 6, wherein said diene reactant is selected from the group consisting of furfuryl alcohol, furfuryl amine, 2-hydroxymethyl-1,3-butadiene, 2-aminomethyl-1,3-butadiene and a compatible mixture of any of them.

9. The crosslinkable composition of matter of claim 1, wherein said dieneophile functional mono-isocyanate reactant comprises the reaction product of (i) diisocyanate reactant in approximately 1:1 molar ratio with (ii) dieneophile reactant selected from the group consisting of monohydroxy functional dieneophile reactant, monoamino functional dieneophile reactant and a compatible mixture of any of them.

10. The crosslinkable composition of matter of claim 9, wherein said dieneophile reactant is selected from the group consisting of methylolmaleimide, hydroxypropyl-methacrylate, allyl alcohol, allyl amine, hydroxyethyl-methacrylate, hydroxyethylacrylate, and a compatible mixture of any of them.

11. The crosslinkable composition of matter of claim 9, wherein said diisocyanate reactant is selected from the group consisting of phenylene diisocyanate, toluene diisocyanate, isophorone diisocyanate, diisocyanatoalkane wherein the alkyl moiety has about three to about ten carbons and a compatible mixture of any of them.

12. The crosslinkable composition of matter according to claim 1, wherein at least one of said diene-functionalized epoxy-amine adduct and dieneophile-functionalized epoxy-amine adduct bears hydroxy functionality, said composition further comprising crosslinking agent substantially reactive with hydroxy functionality.

13. The crosslinkable composition of matter according to claim 1 adapted for use in coating compositions that retard corrosion of corrosion susceptible substrates, further comprising organic solvent, wherein said diene-functionalized epoxy-amine adduct is of number average molecular weight about 800–2000, and said dieneophile-functionalized epoxy-amine adduct is of number average molecular weight about 800–2000.

14. A crosslinkable composition of matter adapted for use in electrodeposition of coatings on a substrate, which coatings are heat curable, which composition comprises:
    A. substantially gel-free conjugated diene-functionalized epoxy-amine adduct, at least partially neutralized with solubilizing acid, comprising the reaction product of:
        (i) first polyhydroxy functional epoxy-amine reactant comprising the reaction product of polyepoxy reactant having an average of at least about 2 epoxy groups per molecule, with secondary amine reactant having a total of less than about 20 carbons per amino nitrogen, wherein each hydroxy group, if any, of the secondary amine is removed at least 1 carbon from each amino nitrogen, with (ii) conjugated diene functional mono-isocyanate reactant; and B. substantially gel-free dieneophile-functionalized epoxy-anine adduct, other than said conjugated diene functionalized epoxy-amine adduct, at least partially neutralized with solubilizing acid, which dieneophile-functionalized epoxy-amine adduct comprises the reaction product of:

(i) second polyhydroxy functional epoxy-amine reactant comprising the reaction product of polyepoxy reactant having an average of at least about 2 epoxy groups per molecule, with secondary amine reactant having a total of less than about 20 carbons per amino nitrogen, wherein each hydroxy group, if any, of the secondary amine is removed at least 1 carbon from each amino nitrogen, with (ii) dieneophile functional mono-isocyanate reactant;

which at least partially neutralized diene-functionalized epoxy-amine adduct and dieneophile-functionalized epoxy-amine adduct are dispersed in aqueous solvent.

15. The crosslinkable composition of matter of claim 14, wherein said polyepoxy reactant for at least one of said first and said scond polyhydroxy functional epoxy-amine reactants has number average molecular weight about 700–8000.

16. The crosslinkable composition of matter of claim 14, wherein said secondary amine reactant for at least one of said first and said second polyhydroxy functional epoxy-amine reactants is selected from the group consisting of dialkylamine, dialkanolamine, N-alkylaniline or a compatible mixture of any of them, wherein each alkyl moiety and each alkanol moiety has from one to about ten carbons.

17. The crosslinkable composition of matter of claim 14, wherein said secondary amine reactant for at least one of said first and said second polyhydroxy functional epoxy-amine reactants consists essentially of diethanolamine.

18. The crosslinkable composition of matter of claim 14, wherein said diene functional mono-isocyanate reactant comprises the reaction product of (a) diisocyanate reactant in approximately 1:1 molar ratio with (b) diene reactant selected from the group consisting of monohydroxy functional diene reactant, monoamino functional diene reactant and a compatible mixture of any of them.

19. The crosslinkable composition of matter of claim 18, wherein said diisocyanate reactant is selected from the group consisting of phenylene diisocyanate, toluene diisocyanate, isophorone diisocyanate, diisocyanatoalkane wherein the alkyl moiety has about three to about ten carbons and a compatible mixture of any of them.

20. The crosslinkable composition of matter of claim 18, wherein said diene reactant is selected from the group consisting of furfuryl alcohol, furfuryl amine, 2-hydroxymethyl-1,3-butadiene, 2-aminomethyl-1,3-butadiene and the like and a compatible mixture of any of them.

21. The crosslinkable composition of matter of claim 14, wherein said dieneophile functional mono-isocyanate reactant comprises the reaction product of (i) diisocyanate reactant in approximately 1:1 molar ratio with (ii) dieneophile reactant selected from the group consisting of monohydroxy functional dieneophile reactant, monoamino functional dieneophile reactant and a compatible mixture of any of them.

22. The crosslinkable composition of matter of claim 21, wherein said dieneophile reactant is selected from the group consisting of methylolmaleimide, hydroxypropyl-methacrylate, allyl alcohol, allyl amine, hydroxyethyl-methacrylate, hydroxyethylacrylate and a compatible mixture of any of them.

23. The crosslinkable composition of matter of claim 21, wherein said diisocyanate reactant is selected from the group consisting of phenylene diisocyanate, toluene diicoyanate, isophorone diisocyanate, diisocyanatoalkane wherein the alkyl moiety has about three to about ten carbons and a compatible mixture of any of them.

24. The crosslinkable composition of matter of claim 14, wherein said diene-functionalized epoxy-amine adduct and said dieneophile-functionalized epoxy-amine adduct are each at least partially neutralized with organic acid selected from the group consisting of acetic acid, lactic acid, formic acid, butyric acid and a compatible mixture of any of them.

25. The crosslinkable composition of matter according to claim 14, wherein at least a portion of said diene-functionalized epoxy-amine adduct or said dieneophile-functionalized epoxy-amine adduct bears hydroxy functionality, said composition further comprising crosslinking agent substantially reactive with said hydroxy functionality.

26. The crosslinkable composition of matter of claim 14 further comprising an organic coupling solvent miscible with water.

27. The crosslinkable composition of matter according to claim 14, wherein said diene-functionalized epoxy-amine adduct is of number average molecular weight 2000–7000, and said dieneophile-functionalized epoxy-amine adduct is of number average molecular weight about 2000–7000.

28. A crosslinkable composition of matter adapted for use in electrodeposition of coatings on a substrate, which coatings are heat curable, which composition comprises:

A. substantially gel-free diene-functionalized epoxy-amine adduct of number average molecular weight about 2000–7000, at least partially neutralized with solubilizing acid selected from the group consisting of acetic acid, lactic acid, formic acid, butyric acid and a compatible mixture of any of them, which diene-functionalized epoxy-amine adduct comprises the reaction product of:

(i) first polyhydroxy functional epoxy-amine reactant comprising the reaction product of polyepoxide reactant having an average of at least about two epoxy groups per molecule with secondary amine reactant selected from the group consisting of dialkanolamine wherein each alkanol moiety has about one to three carbons, with (ii) diene functional mono-isocyanate reactant comprising the reaction product of (a) diisocyanate reactant selected from the group consisting of phenylene diisocyanate, toluene diisocyanate, isophorone diisocyanate, diisocyanatoalkane wherein the alkyl moiety has about three to about ten carbons, and a compatible mixture of any of them, with (b) diene reactant selected from the group consisting of furfuryl amine, 2-aminomethyl-1,3-butadiene and a compatible mixture of any of them; and B. substantially gel-free dieneophile-functionalized epoxy-amine adduct of number average molecular weight about 2000–7000, at least partially neutralized with said organic acid, which dieneophile functionalized epoxy-amine adduct comprises the reaction product of:

(i) second polyhydroxy functional epoxy-amine reactant comprising the reaction product of polyepoxide reactant having an average of at least about two epoxy groups per molecule with secondary amine reactant selected from the group consisting of dialkanolamine wherein each alkanol moiety has about one to three carbons; with (ii) dieneophile functional mono-isocyanate reactant comprising the reaction product of (a) diisocyanate reactant selected from the group consisting of phenylene diisocyanate, toluene, diisocyanate, isophorone diisocyanate, diisocyanatoalkane wherein the alkyl moiety has about three to about ten carbons, and a compatible mixture of any of them, with (b) dieneophile reactant selected from the group consisting of methylolmaleimide, hydroxypropylmethacrylate, allyl alcohol, allyl amine, hydroxyethyl-methacrylate, hydroxyethylacrylate and a compatible mixture of any of them;

which at least partially neutralized diene-functionalized epoxy-amine adduct and dieneophile functionalized epoxy-amine adduct are dispersed together in aqueous solvent.

* * * * *